US012618499B2

(12) United States Patent
Gupta et al.

(10) Patent No.: US 12,618,499 B2
(45) Date of Patent: May 5, 2026

(54) GIMBALS AND THEIR MANUFACTURE

(71) Applicant: ROLLS-ROYCE plc, London (GB)

(72) Inventors: Alok Gupta, Derby (GB); Daniel J. Cousins, Derby (GB); Andrea L. Ball, Derby (GB)

(73) Assignee: ROLLS-ROYCE PLC, London (GB)

( * ) Notice: Subject to any disclaimer, the term of this patent is extended or adjusted under 35 U.S.C. 154(b) by 521 days.

(21) Appl. No.: 17/117,812

(22) Filed: Dec. 10, 2020

(65) Prior Publication Data

US 2021/0180733 A1 Jun. 17, 2021

(30) Foreign Application Priority Data

Dec. 17, 2019 (GB) ...................................... 1918607

(51) Int. Cl.
*F16L 27/107* (2006.01)

(52) U.S. Cl.
CPC .................................. *F16L 27/107* (2013.01)

(58) Field of Classification Search
CPC .......... F16L 27/02; F16L 27/04; F16L 27/111; F16L 51/025; F16L 51/027; F16L 27/0857; F16L 27/0853
See application file for complete search history.

(56) References Cited

U.S. PATENT DOCUMENTS

| | | | | |
|---|---|---|---|---|
| 3,232,646 | A | * | 2/1966 | Stark ................... F16L 27/0857 |
| | | | | 29/411 |
| 3,915,482 | A | * | 10/1975 | Fletcher .............. F16L 27/0857 |
| | | | | 285/226 |
| 4,508,373 | A | * | 4/1985 | Ward ...................... F16L 27/02 |
| | | | | 285/288.1 |

(Continued)

FOREIGN PATENT DOCUMENTS

| | | |
|---|---|---|
| EP | 0 519 636 A1 | 12/1992 |
| EP | 3348891 A1 | 7/2018 |

(Continued)

OTHER PUBLICATIONS

Amit Bandyopadhyay, "Additive manufacturing of multi-material structures", Jul. 2018, "https://www.sciencedirect.com/science/article/pii/S0927796X18300780" (Year: 2018).*

(Continued)

*Primary Examiner* — Matthew Troutman
(74) *Attorney, Agent, or Firm* — Oliff PLC

(57) ABSTRACT

A gimbal for connecting pipes having a core portion and at least one joint shield portion that surrounds the core portion. The core portion, which has a core portion internal surface and a core portion external surface, has at least two pipe engaging portions that are separated by at least one flexible portion, which has a flexible portion internal surface and a flexible portion external surface, and a plurality of joint cover portions. Each joint cover portion extends from the core portion external surface of the core portion to provide a protective cover for the flexible portion external surface of at least one flexible portion of the core portion and is pivotably connected to a least one joint shield portion. The shield portion is configured to provide a protective shield for at least one flexible portion of the core portion.

22 Claims, 6 Drawing Sheets

(56)  References Cited

U.S. PATENT DOCUMENTS

| | | | | |
|---|---|---|---|---|
| 4,643,463 | A * | 2/1987 | Halling ............... | F16L 27/0857 |
| | | | | 285/226 |
| 5,280,968 | A * | 1/1994 | Moore ................ | F16L 27/0857 |
| | | | | 285/422 |
| 6,471,484 | B1 | 10/2002 | Crall | |
| 7,040,666 | B2 * | 5/2006 | Christianson ........... | F02K 1/805 |
| | | | | 285/264 |
| 9,163,762 | B2 * | 10/2015 | French ................ | F16L 27/0857 |
| 10,837,405 | B2 * | 11/2020 | Hawksworth .......... | F16M 13/02 |
| 11,085,565 | B2 * | 8/2021 | Tajiri ...................... | F16L 27/02 |
| 11,530,765 | B2 * | 12/2022 | Thompson .......... | F16L 27/0857 |
| 2004/0245770 | A1 | 12/2004 | Christianson et al. | |
| 2018/0128170 | A1 | 5/2018 | Owdeh et al. | |
| 2018/0202589 | A1 | 7/2018 | Tajiri et al. | |
| 2018/0202590 | A1 * | 7/2018 | Tajiri ................. | F16L 27/0857 |
| 2020/0041050 | A1 * | 2/2020 | Sparks ...................... | F02K 9/44 |
| 2020/0393067 | A1 * | 12/2020 | Thompson .......... | F16L 27/0857 |

FOREIGN PATENT DOCUMENTS

| | | | |
|---|---|---|---|
| EP | 3470721 | A1 | 4/2019 |
| EP | 3578865 | A1 | 12/2019 |

OTHER PUBLICATIONS

Apr. 23, 2021 extended Search Report issued in European Patent Application No. 20208384.6.

* cited by examiner

GIMBALS AND THEIR MANUFACTURE

CROSS-REFERENCE TO RELATED APPLICATIONS

This specification is based upon and claims the benefit of priority from United Kingdom patent application number GB 1918607.1 filed on Dec. 17, 2019, the entire contents of which is incorporated herein by reference.

BACKGROUND

Field of the Disclosure

The present disclosure relates to gimbals and a method of manufacturing gimbals. The gimbals may be used for example on gas turbine aircraft engines.

Description of the Related Art

A gimbal is a 3-dimensional connecting two ducts/pipes that allows for angular movements between the connected ducts/pipes by providing two orthogonal axes of rotation. Gimbals are often used, for example, to provide flexible connections in between certain parts of the ducting which are often long running and are installed between certain parts of a gas turbine aircraft engine. Having a flexible connection reduces the stresses that result from the duct's ends moving during engine manoeuvres and to reduce thermal stresses in the ducting during engine operation.

FIG. 1 shows known gimbals located on the fan case of a gas turbine aircraft engine. It is not uncommon for a gas turbine aircraft engine to have 10 to 15 gimbals.

FIG. 2 shows an exploded view of the known gimbal shown in FIG. 1. Each gimbal consists of 12 sub-components. The gimbals are manufactured using traditional extrusion, rolling and forming processes which require a number of welds to connect various pins, devises, bellows and flanges. Welding requires the services of skilled welders and yet components that fail in service often fail as a result of one or more welds used to manufacture the component failing.

The method of manufacturing the gimbal of FIGS. 1 and 2 restricts the size, design and strength of the gimbal that is manufactured. The gimbal design does not have sufficient strength to contain pressurised liquids therefore currently, its use is limited to connecting ducts that carry air.

There is therefore a need to provide a gimbal that overcomes or at least minimises the disadvantages and limitations of the aforementioned known gimbal or at least provides a useful alternative to that and other known gimbals.

SUMMARY OF THE DISCLOSURE

According to a first aspect there is provided a gimbal for connecting pipes, the gimbal comprises a core portion and at least one joint shield portion that surrounds the core portion; the core portion, which has a core portion internal surface and a core portion external surface, comprises and at least two pipe engaging portions that are separated by at least one flexible portion, which has a flexible portion internal surface and a flexible portion external surface, and a plurality of joint cover portions; each joint cover portion extends from the core portion external surface of the core portion to provide a protective cover for the flexible portion external surface of at least one flexible portion of the core portion and is pivotably connected to a least one joint shield portion; the or each joint shield portion is configured to provide a protective shield for at least one flexible portion of the core portion; and the core portion and the or each joint shield portion are formed as a single unitary component.

The gimbal may be used for connecting pipes or ducts of the gas turbine engine. Benefits include reducing part count, avoiding the need for any welding, improving gimbal strength, providing a gimbal that is suitable for carrying fluids generally, and potentially providing a "fit-and-forget" component.

In some embodiments, the core portion and the or each joint shield portion are formed as a single unitary component by an additive layer manufacturing process. Additive layer manufacturing provides flexibility in the design, sizing and optimisation of gimbals for specific uses and applications.

In some embodiments, one or more of the core portion, the pipe engaging portions, the or each flexible portion, and the or each joint shield portion is cylindrical in cross-section.

Such portions being cylindrical, be that generally cylindrical or substantially cylindrical, provides structural strength, e.g. by balancing stresses, and is especially compatible with ducts and piping that are also cylindrical in cross-section.

In some embodiments, the gimbal has two or more joint cover portions that are equally spaced around the core portion of the gimbal. Such arrangements assist in providing structural strength to the gimbal.

In some embodiments, the core portion further comprises at least one core portion joint guard that provides protective cover for at least one flexible portion. Such arrangements optimise protective cover for the or each flexible portion.

In some embodiments, the core portion joint guard is configured to complement the configuration of the joint cover portion to maximise protective cover for at least one flexible portion of the gimbal. Such arrangements optimise protective cover for the flexible portion(s) and help to optimise the structural strength of the gimbal.

In some embodiments, the or each joint shield portion and the joint cover portions are configured to complement each other in order to maximise protective shielding for the or each flexible portion of the gimbal. Such arrangements optimise protective shielding for the flexible portion(s) and help to optimise the structural strength of the gimbal.

In some embodiments, the gimbal has two to six joint cover portions and a single joint shield portion. The provision of multiple joint cover portions optimises protective shielding for the flexible portion(s) of the gimbal and helps to optimise the structural strength of the gimbal.

In some embodiments, the gimbal has four joint cover portions, a single joint shield portion, and the core portion has two pipe engaging portions and a single flexible portion. Such an arrangement provides a first embodiment of the gimbal of the present disclosure that usefully balances structural strength and structural simplicity.

In some embodiments, at least one of the pipe engaging portions is elongated. Such an arrangement enables fluid flow to be directed through the gimbal.

In some embodiments, at least one of the pipe engaging portions is curved. Such an arrangement enables fluid flow to be directed through the gimbal, for example involving a change in the plane of the fluid flow whilst avoiding the critical stress location that would be formed by an elbow and that avoids involving any welding of separate parts.

In some embodiments, the gimbal has four joint cover portions, a single joint shield portion, and the core portion has three pipe engaging portions and one flexible portion. Such an arrangement usefully provides embodiments where one stream of fluid is separated in the gimbal into two streams of fluid, or two streams of fluid converge in the gimbal into a single stream of fluid.

In some embodiments, the gimbal has six to twelve joint cover portions, three joint shield portions, and the core portion has three pipe engaging portions and three flexible portions. Such an arrangement usefully provides embodiments where one stream of fluid is separated in the gimbal into two streams of fluid, or two streams of fluid converge in the gimbal into a single stream of fluid, with optimised flexibility and fluid directing capability.

In some embodiments, the gimbal has at least one compartment containing vibration stress dampening material. Such an arrangement can dampen vibration stresses. The compartment may, for example, be formed within the joint cover portion, for example, adjacent the first pipe engaging portion of the gimbal.

In some embodiments, each joint cover portion has an aperture that receives a pin portion that extends inwardly from the joint shield portion so the joint cover portion id pivotable with respect to the joint shield portion.

According to a second aspect there is provided a gas turbine engine that includes at least one gimbal of the first aspect.

According to a third aspect there is provided a method for manufacturing a gimbal of the first aspect, the method comprising forming a gimbal of the first aspect by additive layer manufacturing.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

Figure 1:
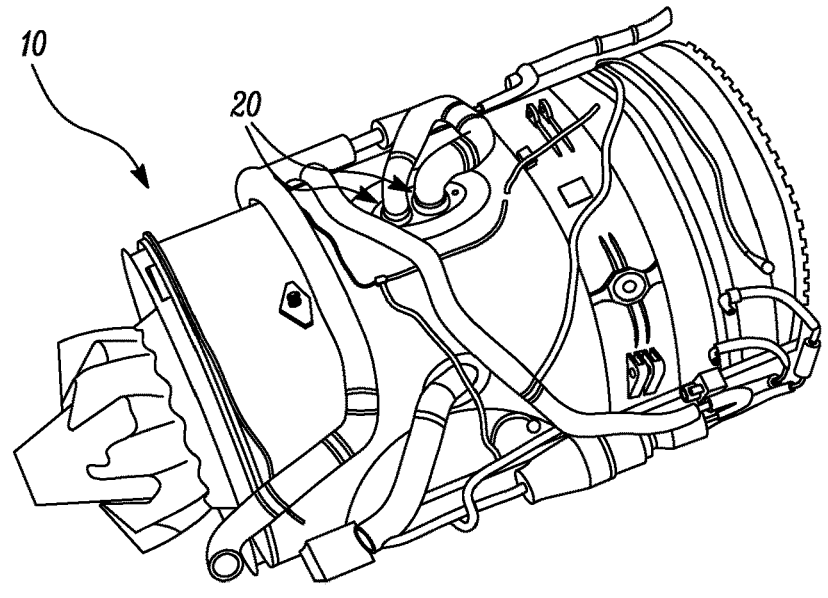
FIG. 1 is a perspective view of a gas turbine engine with its nacelle removed and indicates where two known gimbals are located on the engine.

The following table lists the reference numerals used in the drawings:

| Ref no. | Feature |
| --- | --- |
| 10 | Gas turbine engine |
| 20 | Known gimbal |
| 21 | Liners |
| 22 | Bellow |
| 23 | Pin |
| 24 | Body ring |
| 25 | Weld Ring |
| 26 | Clevises |
| 28 | Pipe |
| 30 | One-component gimbal |
| 40 | Core portion |
| 41 | Core portion internal surface |
| 42 | Core portion external surface |
| 43 | First pipe engaging portion |
| 44 | Second pipe engaging portion |
| 45 | Third pipe engaging portion |
| 46 | Flexible portion |
| 47 | Flexible portion internal surface |
| 48 | Flexible portion external surface |
| 49 | Core portion joint guard |
| 50 | Joint cover portion |
| 51 | Joint cover portion internal surface |
| 52 | Joint cover portion external surface |
| 60 | Joint shield portion |
| 61 | Joint shield portion internal surface |
| 62 | Joint shield portion external surface |
| 64 | Pin portion |
| 65 | Compartment |
| 66 | Vibration stress dampening material |

DETAILED DESCRIPTION OF THE DISCLOSURE

Aspects and embodiments of the present disclosure will now be discussed with reference to the accompanying figures. Further aspects and embodiments will be apparent to those skilled in the art.

The present disclosure relates to a gimbal for use, for example in a gas turbine engine. The gimbal provides a flexible connection for pipes or ducting in a gas turbine engine. They are typically located on and around the core engine of a gas turbine engine connecting pipes and ducts that run into and out of the core engine. While the movement of such piping and ducting is typically restricted within the confines of a core engine nacelle, they are still prone to movement during engine operation. The use of flexible connections assists the arrangement of piping and ducting to resist the stresses placed on them during engine operation.

In broad terms the gimbal of the present disclosure comprises a core portion and at least one joint shield portion that that surrounds the core portion, the core portion and the at least one joint shield portion being formed as a single unitary component.

Figure 3:
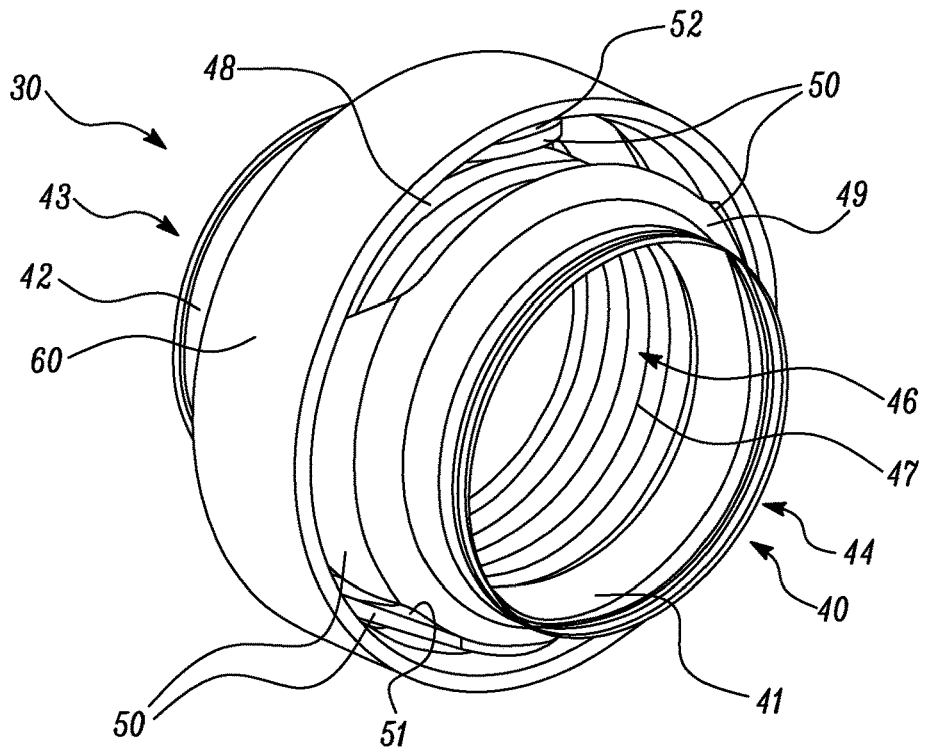
FIG. 3 is a perspective view of a first embodiment of a gimbal of the present disclosure.

FIG. 3 shows a perspective view of a first embodiment of a gimbal 30 of the present disclosure. It may be used, for example, for connecting pipes, ducts and the like of a gas turbine engine. The gimbal 30 has a core portion 40 and a joint shield portion 60 that surrounds the core portion. The joint shield portion surrounds the core portion by encircling at least part of the core portion. The core portion and the joint shield portion form the gimbal as a single unitary component i.e. the gimbal is made and used as a single, one-part, component.

The core portion 40 of the gimbal 30 has a core portion internal surface 41 and a core portion external surface 42 and it comprises a first pipe engaging portion 43 and a second pipe engaging portion 44 that is separated by a flexible portion 46. The flexible portion 46 has a flexible portion internal surface 47 and a flexible portion external surface 48. The core portion further comprises a plurality of joint cover portions 50.

The first pipe engaging portion 43 and the second pipe engaging portion 44 of the first embodiment of FIG. 3 are cylindrical in cross-section to assist in providing fluid-tight connections to pipes and ducts that are also typically cylindrical in cross-section. The cylindrical cross-section also provides hoop strength and therefore assists in resisting internal pressures.

The gimbal of the first embodiment has four joint cover portions 50, equally spaced around the periphery of the core portion 40. Fully functional gimbals can be made with various numbers of joint cover portions, however for the first embodiment, four joint cover portions 50 were chosen to balance part strength for its intended purpose for use in connecting pipes in a gas turbine aircraft engine.

Each joint cover portion 50 of the first embodiment of gimbal 30 of the present disclosure has a joint cover portion internal surface 51 and a joint cover portion external surface 52. The joint cover portion 50 extends from the core portion external surface 42 and is configured to protect at least part of the flexible portion external surface 48 of the flexible portion 40.

Each joint cover portion 50 is pivotally connected to the joint shield portion 60. This enables the gimbal to accommodate angular movements of the ducts that are connected by the gimbal. The manner in which the joint cover portions are pivotally connected to the joint shield portion in the first embodiment of gimbal of the present disclosure is described below.

Figure 2:
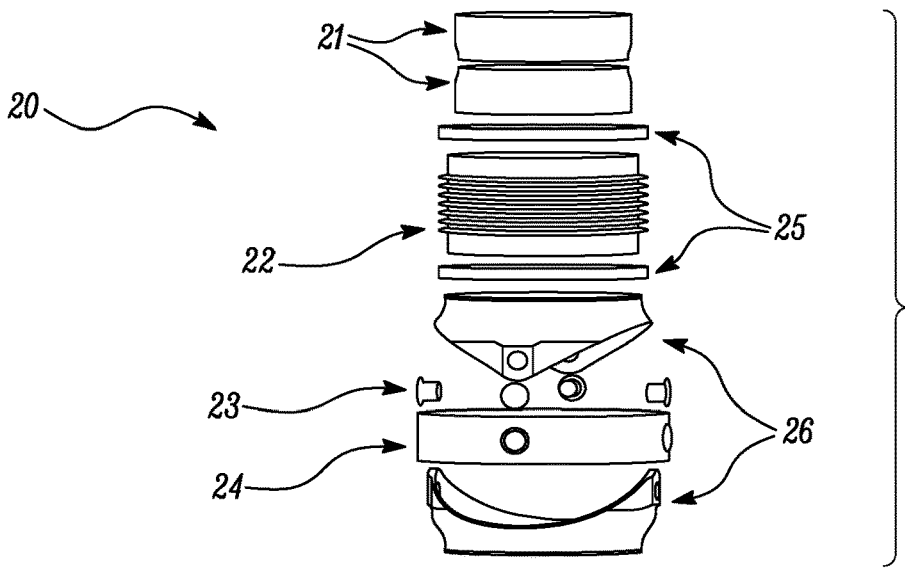
FIG. 2 is an exploded view of a known gimbal used on gas turbine engines.

The joint cover portion 50 may take various forms to fulfil its purpose. In the first embodiment shown in FIG. 3 each of the four joint cover portions 50 has a common shape, two of those extending generally axially in one direction and the other two extending generally axially an opposed direction but they are all pivotally connected to the joint shield portion 60. In this way the gimbal of the present disclosure is formed in a manner that is analogous in function to the devises 26 and body ring 24 of the gimbal shown in FIGS. 1 and 2.

In the embodiment shown in FIG. 3 the core portion 40 of the gimbal 30 has at least one core portion joint guard 49 that extends from the core portion external surface 42. In the Figure one can most easily see a core portion joint guard 49 that extends from the core portion external surface 42 that is adjacent the second pipe engaging portion 44 of the gimbal 30.

The core portion joint guard 49 serves the purpose of providing a protective shield for part of the flexible portion 46, for example the part of the flexible portion 46 that is not protected, or only partially protected, by the joint cover portion 50. The core portion joint guard 49 may take various forms to fulfil its purpose. It may be annular to maximise protective cover for the flexible portion 46. The length and/or shape of the core portion joint guard 49 may vary around the core portion 40. The core portion joint guard 49 may be configured to complement the configuration of the joint cover portion 50, for example in order to maximise protective shielding for the flexible portion 46 of the gimbal 30.

In the first embodiment the core portion 40 has four core portion joint guards 49, two each side of the joint shield portion 60. Each core portion joint guard 49 forms part of the gimbal that extends from the core portion that forms adjoining the joint cover portions 50. The arrangement is such that each core portion joint guard 49 faces a joint cover portion 50 the combination of the two providing a protective cover of the flexible portion 46 located between them.

Figure 4:
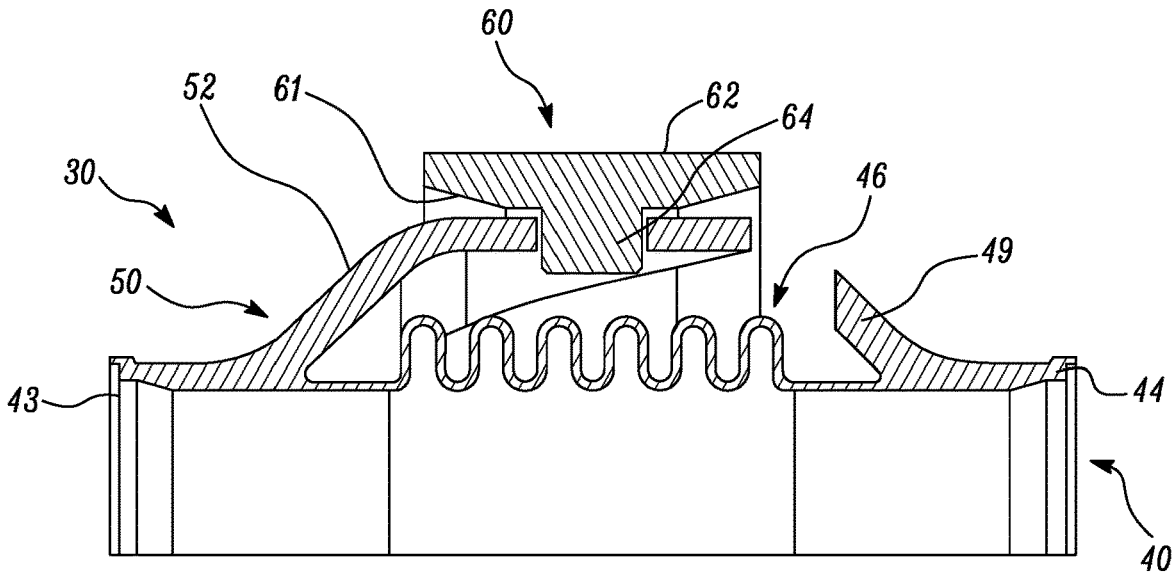
FIG. 4 is a vertical cross-sectional view of part of the first embodiment of the gimbal of the present disclosure shown in FIG. 3.

FIG. 4 shows a vertical cross-sectional view of part of the first embodiment of the gimbal of the present disclosure shown in FIG. 3. This shows more clearly how the joint cover portions 50 are configured to provide protective cover for the flexible portion 46 of the core portion 40 and how the joint cover portions 50 are pivotally connected to the joint shield portion 60. FIG. 4 also shows more clearly how each of the joint cover portions 50 can work in concert with each of the four core portion joint guards 49 to protect the flexible portion 46.

The joint shield portion 60 has a joint shield portion internal surface 61 and a joint shield portion external surface 62. The joint shield portion 60 may take various forms to fulfil its purpose. It may be annular to maximise protective cover for the flexible portion 46 and the joint cover portion 50, e.g. as per the first embodiment. In other embodiments the width and/or shape of the joint shield portion 60 may vary around the core portion 40. The joint shield portion 60, the joint cover portion 50, and the core portion joint guards 49 are configured to complement each other, for example in order to maximise protective shielding for the flexible portion 46 of the gimbal 30.

In the embodiment of the gimbal of the present disclosure shown in FIG. 4, the joint shield portion 60 has a pin portion 64 that extends inwardly from the joint shield portion, i.e. towards the flexible portion 46 and passes through an aperture formed in the joint cover portion 50. The pin portion 64 is integral to the joint shield portion 60 and enables the joint cover portion 50 to be pivotable with respect to the joint shield portion 60.

The core portion 40 and the joint shield portion 60 are formed as a single unitary component i.e. they form a one-piece gimbal. This provides several benefits:

It reduces the part count i.e. the number of component of the gimbal. For example from 12 for the known gimbal shown in FIGS. 1 and 2 to one of the gimbal of the present disclosure. Reducing complexity and thus reduces part failures, maintenance times, maintenance costs and part storage.

It avoids the need for any welding, which is a time consuming and highly skilled activity.

It provides the potential for improved gimbal strength by avoiding the use and interaction of multiple parts and removing welds.

It provides the potential to suit different clamping or connection options.

It provides the potential to improve system dampening, for example by incorporating pockets or compartments in the gimbal that can be filled with materials that dampen vibration stresses.

It provides the potential for the gimbal to suitable for connecting fuel- and oil-carrying pipes and ducts rather than be limited to connecting air-carrying and other gas-carrying pipes and ducts.

It provides the potential for a gimbal of the present disclosure to be a "fit-and-forget" component i.e. once fitted in a machine, for example a gas turbine engine, it can be relied upon to require minimal and potentially no maintenance for working life of the machine.

Figure 5:
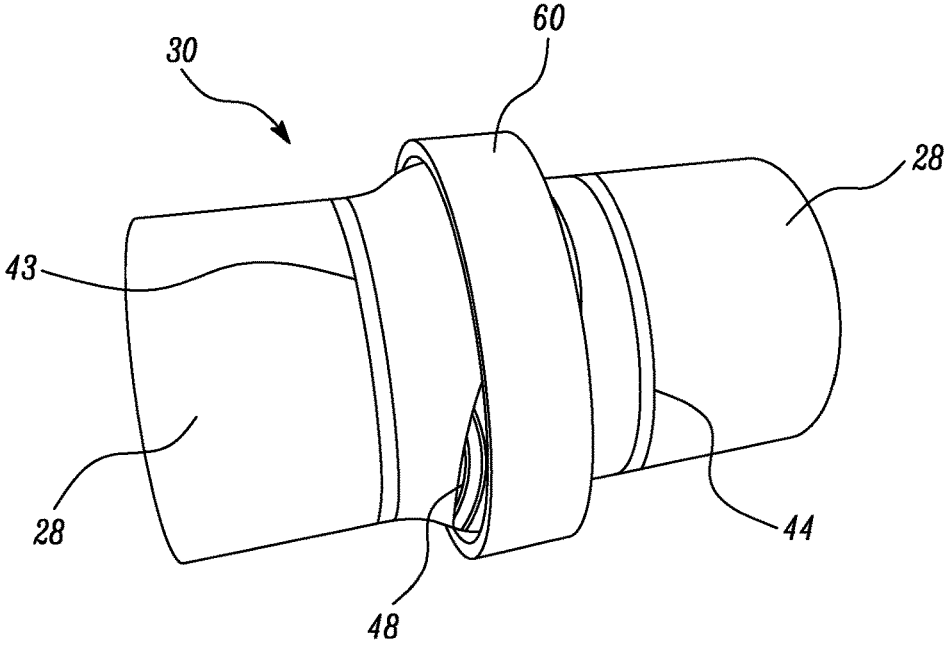
FIG. 5 is a perspective view of the first embodiment of a gimbal of the present disclosure fitted between portions of two cylindrical pipes.
Figure 6:
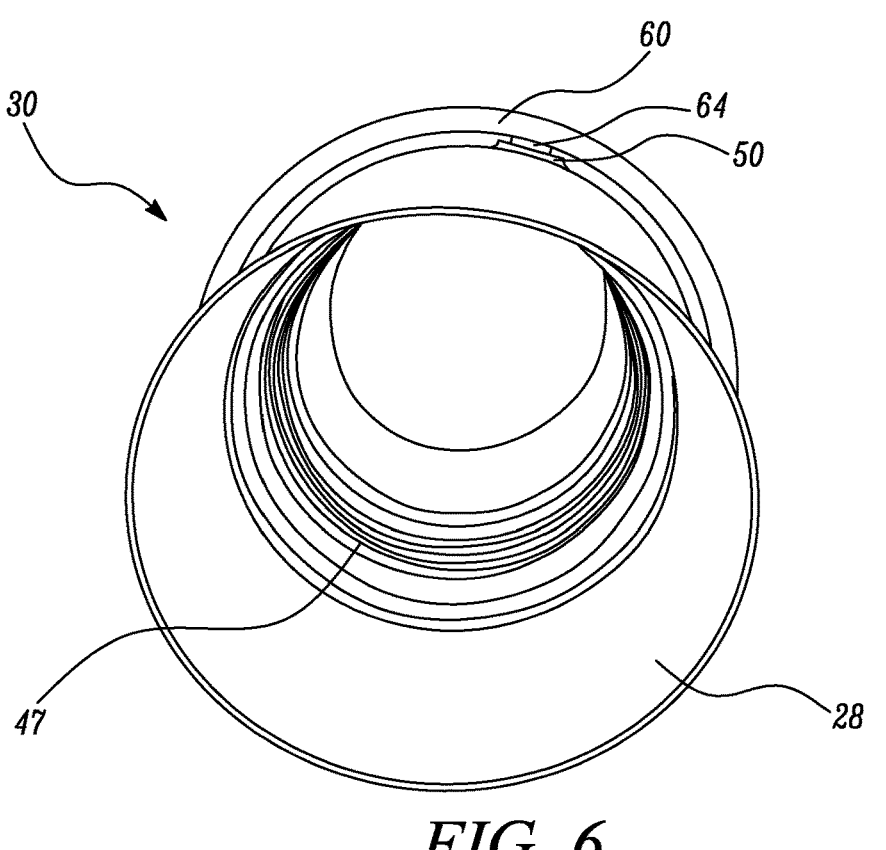
FIG. 6 is a view through the interior of the first embodiment of a gimbal of the present disclosure fitted between portions of two cylindrical pipes.
Figure 7:
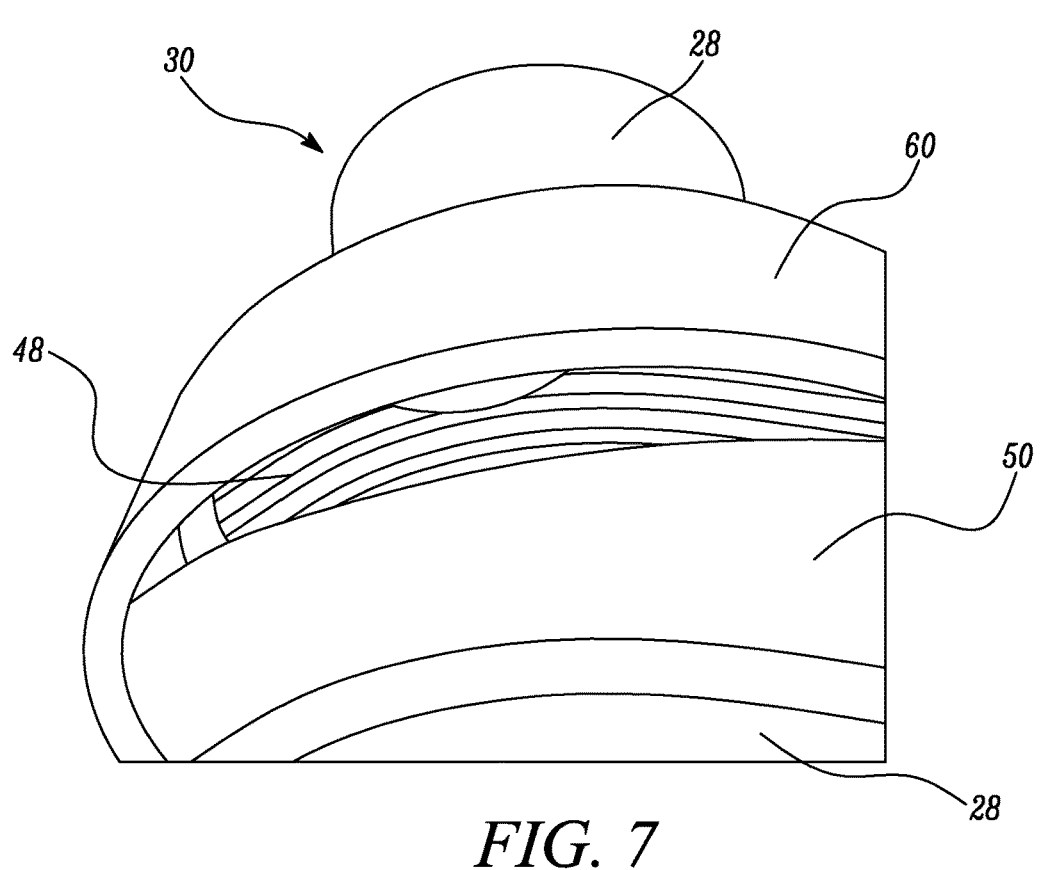
FIG. 7 is a close-up view of the first embodiment of the gimbal of the present disclosure fitted between portions of two cylindrical pipes.

Gimbals of the present disclosure are useful to flexibly connect piping or ducting to certain parts of a gas turbine aircraft engine. FIGS. 5, 6 and 7 depict the above described first embodiment of a gimbal of the present invention flexibly connecting two pipes 28 of a gas turbine engine.

FIG. 5 is a perspective view of the first embodiment of a gimbal 30 of the present disclosure fitted between portions of two cylindrical pipes 28. One end of one of the pipes 28 is secured to the first pipe engaging portion 43 of the gimbal 30 and one end of the other pipe 28 is secured to the second pipe engaging portion 44 of the gimbal 30. The pipes 28 can be secured to first and second pipe engaging portions 43 and 44 by any suitable means. In some arrangements the pipes are permanently fixed to one or both of the first and second pipe engaging portions of the gimbal. In other arrangements the pipes are removably secured to one or both of the first and second pipe engaging portions of the gimbal.

FIG. 6 is a view through the interior of the first embodiment of a gimbal 30 of the present disclosure fitted between portions of two cylindrical pipes 28 of a gas turbine engine. Part of the flexible portion internal surface 47 of the flexible portion 46 of the gimbal 30 is visible through the portion of the pipe 28 in the foreground. One can also see a pin portion 64 of the joint shield portion 60 of the gimbal 30 is received by an aperture in a joint cover portion 50 of the gimbal.

FIG. 7 is a close-up view of the first embodiment of the gimbal of the present disclosure fitted between portions of two cylindrical pipes. Part of the flexible portion external surface 48 of the flexible portion 46 of the gimbal 30 is visible between the joint shield portion 60 of the gimbal 30 and a joint cover portion 50 of the gimbal 30.

Various technologies are known for manufacturing parts as single unitary component. In some embodiments the gimbal of the present disclosure is manufactured by Additive Layer Manufacturing (ALM), also known as "3D printing". Additive Layer Manufacturing involves building a three-dimensional object from a computer-aided design (CAD) model, usually by successively adding material layer by layer. This is in contrast to conventional machining, casting and forging processes, where material is removed from a stock item (subtractive manufacturing) or poured into a mold and shaped by means of dies, presses and hammers.

The flexibility of Additive Layer Manufacturing enables the gimbal of the present disclosure to be designed and made with optimised thermal, vibration and impact load stress relief for a wide variety of pipe/duct designs, thicknesses, diameters, and connection types. Gimbals of the present disclosure e.g. ALM gimbals of the present disclosure, can be designed to suit different clamping/connecting options. Gimbal corrugations can be optimised to meet strength and stiffness requirements. Gimbal corrugations and joints can be optimised to improve system damping. The pipe engaging portions can be formed for bespoke applications e.g. involving different configurations. A single gimbal of the present disclosure can be printed in multiple materials suited to specifics uses and/or use locations. This is can be especially important when manufacturing gimbals for use in gas turbine engine where pipe/duct can exposed to extreme temperatures and pressures during operation.

Additive Layer Manufacturing enables a wide variety of material options from which to form gimbals of the present disclosure. ALM gimbals can be used in critical stress locations of pipes/ducts of gas turbine engines, e.g. elbows, to reduce stress levels caused by end interface movements, vibrations and thermal loading as well as extreme impact loading such as Fan Blade Off (FBO) or Core Blade Off (CBO).

Figure 8:
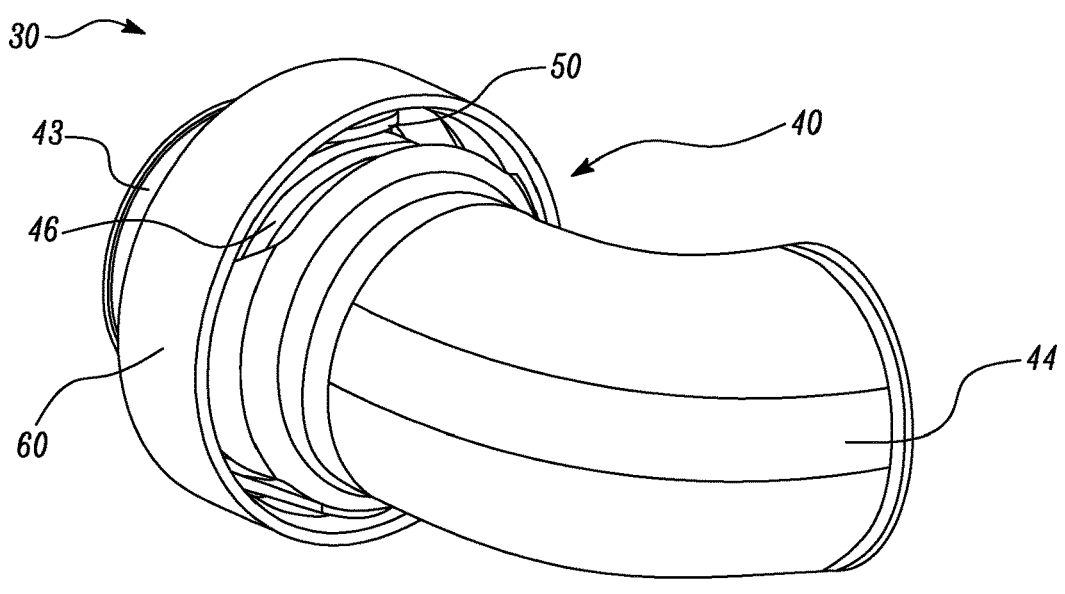
FIG. 8 is a perspective view of a second embodiment of a gimbal of the present disclosure.
Figure 9:
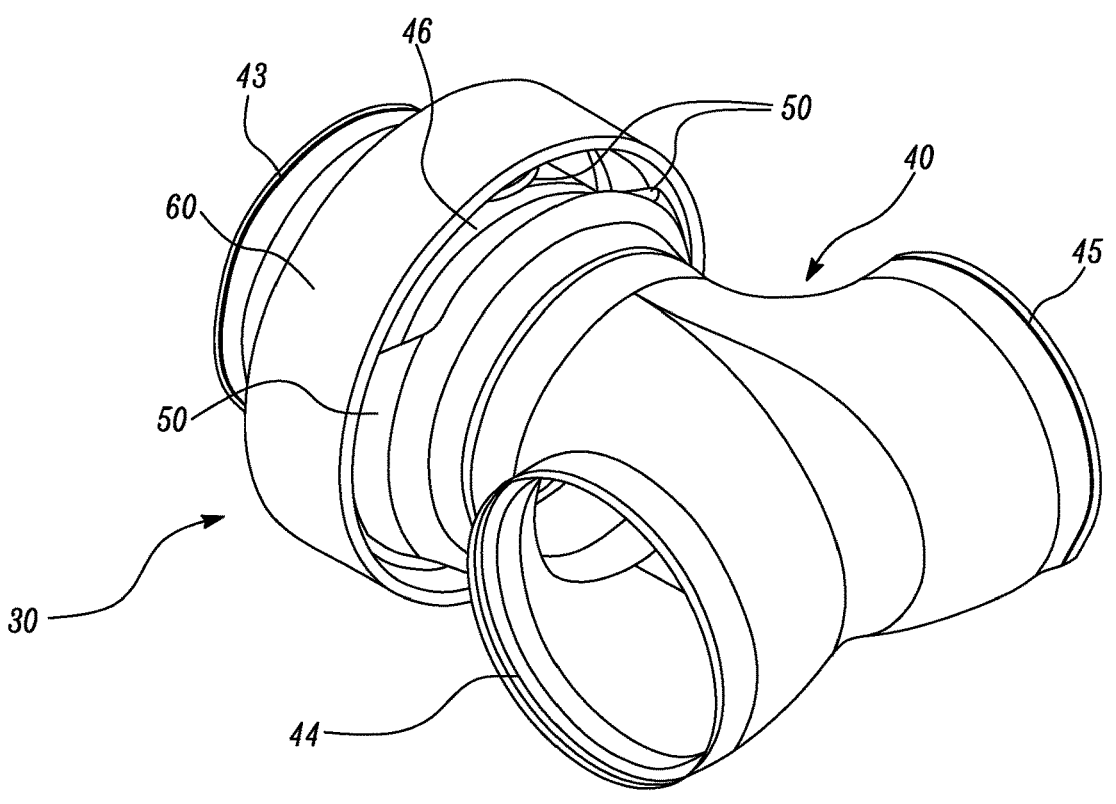
FIG. 9 is a perspective view of a third embodiment of a gimbal of the present disclosure.
Figure 10:
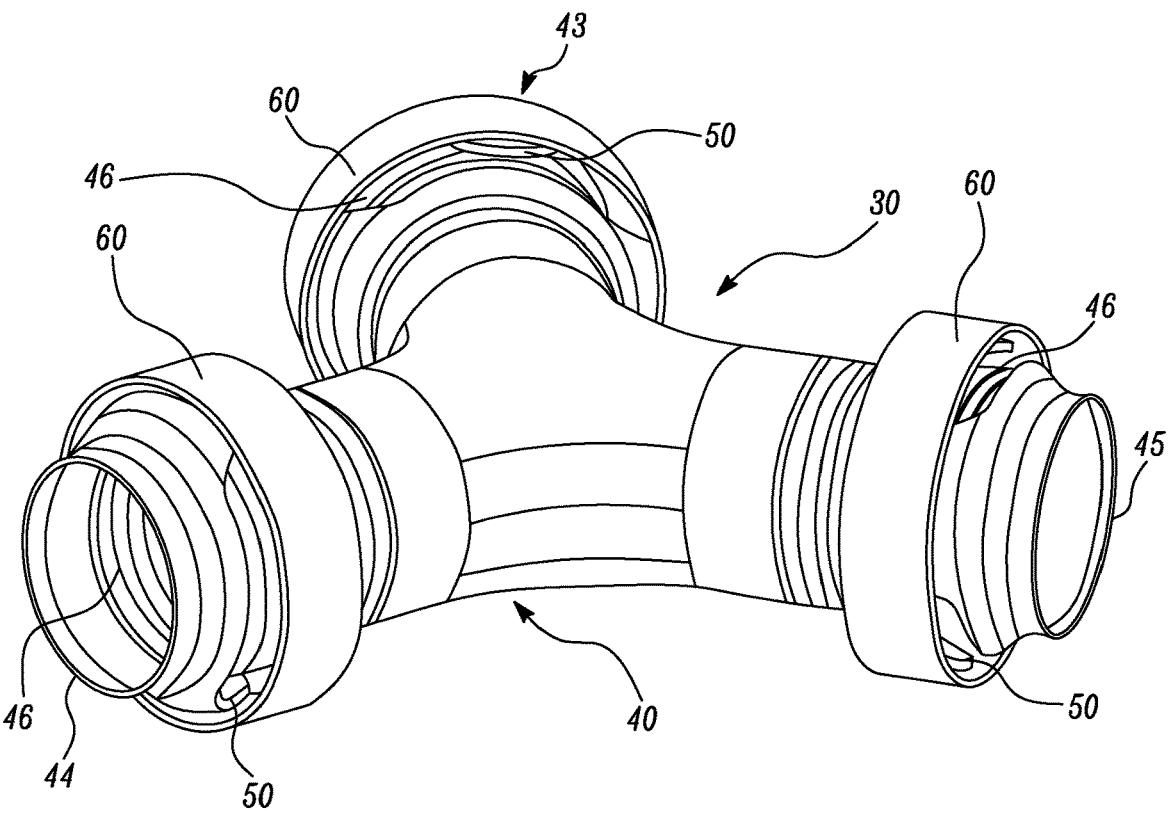
FIG. 10 is a perspective view of a fourth embodiment of a gimbal of the present disclosure.

As evident from the above, gimbals of the present disclosure can take a variety of forms and can be manufactured to meet a variety of needs. FIGS. 3 to 7 depict one embodiment of a gimbal of the present disclosure that is suitable for connecting fluid pipes and ducts in a gas turbine engine. FIGS. 8, 9 and 10 depict three additional embodiments to assist in illustrating the flexibility of the gimbal of the present disclosure at least with respect to the configuration of the gimbal.

FIG. 8 shows a perspective view of a second embodiment of a gimbal of the present disclosure. This gimbal has a core portion 40, four joint cover portions 50 and a joint shield portion 60 that form a single unitary component. The core portion 40 has a first pipe engaging portion 43 and a second pipe engaging portion 44 separated by a flexible portion 46. However while the first pipe engaging portion 43 resembles that of the first embodiment of FIGS. 3 to 7, the second pipe engaging portion 44 is elongated i.e. longer that of the first embodiment, and it is curved. The curved nature of the second pipe engaging portion 44 serves to guide fluid carried within it to a desired axis which is different to the axis of the first pipe engaging portion 43 whilst avoiding the need to weld a separate elbow and thereby improving the strength in these areas.

FIG. 9 shows a perspective view of a third embodiment of a gimbal of the present disclosure. This gimbal has a core portion 40, four joint cover portions 50 and a joint shield portion 60 that form a single unitary component. The core portion 40 has a first pipe engaging portion 43 that resembles that of the first embodiment of FIGS. 3 to 7. However the core portion 40 has a second pipe engaging portion 44 and a third pipe engaging portion 45 so that the gimbal can connect three pipes or ducts. A flexible portion 46 separates the first pipe engaging portion 43 from the second pipe engaging portion 44 and the third pipe engaging portion 45. Such an arrangement is useful, for example, when one stream of fluid into the gimbal is separated into two streams of fluid, or when two streams of fluid converge in the gimbal into a single stream of fluid. The second pipe engaging portion 44 and the third pipe engaging portion 45 are elongated with respect to the first pipe engaging portion 43 and they are angled to provide different inlet and outlet axes. The axes' angular orientation can be chosen as per the requirement to support the pipes/ducts routing.

FIG. 10 shows a perspective view of a fourth embodiment of a gimbal of the present disclosure. This gimbal has a core portion 40, twelve joint cover portions 50 and three joint shield portions 60 that form a single unitary component. The core portion 40 has a first pipe engaging portion 43 that resembles that of the first embodiment of FIGS. 3 to 7 as well as a second pipe engaging portion 44 and a third pipe engaging portion 45 so that the gimbal can connect three pipes or ducts. The first pipe engaging portion 43 and the second pipe engaging portion 44 are separated by two flexible portions 46, the first pipe engaging portion 43 and the third pipe engaging portion 44 are separated by two flexible portions 46, and the second pipe engaging portion 44 and the third pipe engaging portion 44 are separated by two flexible portions 46. The second pipe engaging portion 44 and the third pipe engaging portion 45 are elongated with respect to the first pipe engaging portion 43 and they are angled. Such an arrangement is useful, for example, when one stream of fluid is separated in the gimbal into two streams of fluid, or when two streams of fluid converge in the gimbal into a single stream of fluid.

Figure 11:
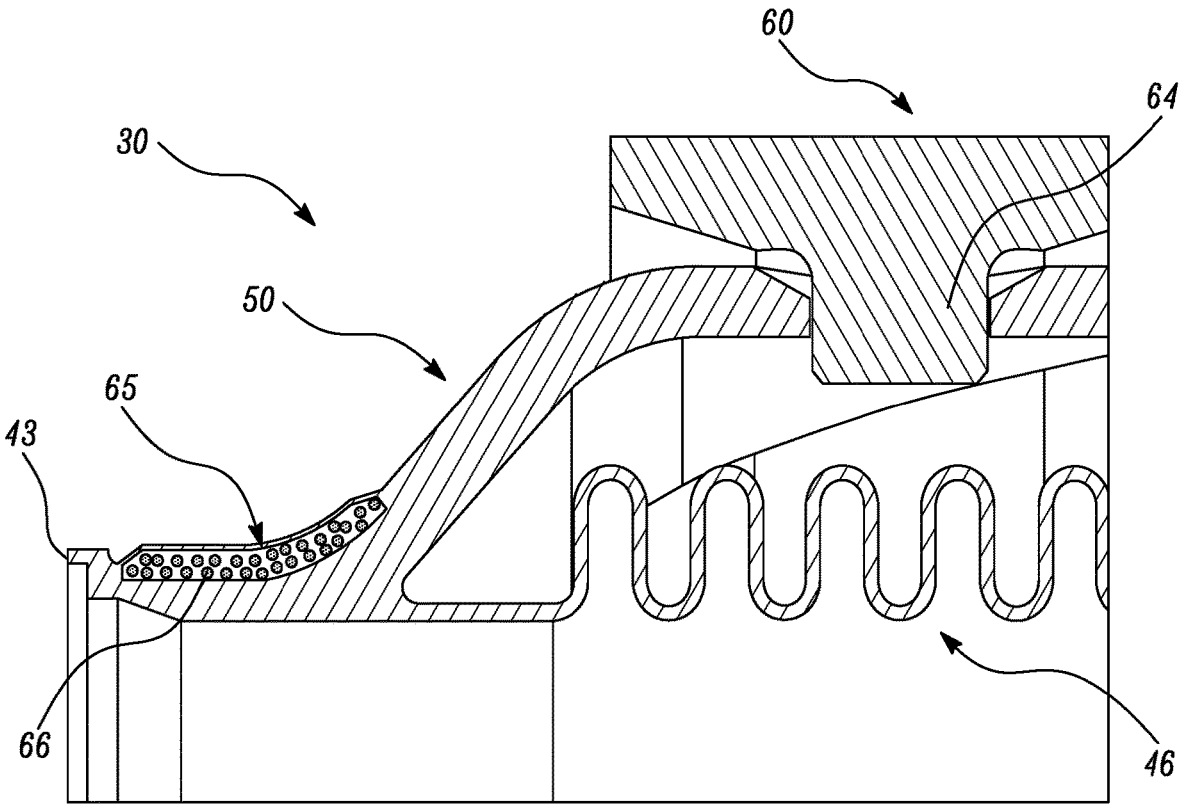
FIG. 11 is a vertical cross-sectional view of part of a fifth embodiment of the gimbal of the present disclosure shown in FIG. 3 that has vibration stress dampening material contained within a compartment formed within the gimbal.

FIG. 11 shows a vertical cross-sectional view of part of the fifth embodiment of a gimbal of the present disclosure.

This embodiment resembles the first embodiment however it includes the aforementioned pockets or compartments 65 in the gimbal that are filled with a material 66, for example a powdered material, which dampens vibration stresses. The pockets or compartments 65 are formed in the joint cover portion adjacent the first pipe engaging portion of the gimbal.

As mentioned above, various technologies are known for manufacturing parts as single unitary components. These technologies include Additive Layer Manufacturing (ALM), which offers great flexibility in the manufacture of one component gimbals. Additive Layer Manufacturing (ALM) covers a variety of methods that involve building a three-dimensional object from a computer-aided design (CAD) model, usually by adding material layer by layer.

One skilled in the art can choose a material that is suitable to meet the service requirements for the gimbal. For example, the material may comprise one or more of titanium, a titanium alloy, steel, a steel alloy, aluminium, an aluminium alloy and a nickel-based superalloy.

While the gimbal of the present disclosure has been described with reference to embodiments that are suitable for use in gas turbine engines, for example gas turbine aircraft engines, it should be understood that the gimbal of the present disclosure could be used for other purposes and in other industries. For example in domestic or commercial plumbing, air conditioning or heating. It may also have application in automotive, marine, submarine, industrial power, nuclear, oil and gas industries.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gimbal for connecting pipes, the gimbal comprising:
a core portion that comprises (i) at least two pipe engaging portions that are separated by at least one flexible portion, and (ii) a plurality of joint cover portions that each extend from an external surface of the core portion and provide a protective cover for an external surface of the at least one flexible portion; and
at least one joint shield portion that surrounds the core portion to provide a protective shield for the at least one flexible portion, and includes a plurality of pin portions that are integrally formed therewith as a single piece, wherein
each of the plurality of pin portions interlocks with a respective one of the plurality of joint cover portions to pivotably connect the at least one joint shield portion to the joint cover portions; and
the core portion, including the joint cover portions, and the at least one joint shield portion, including the plurality of pin portions, are formed as a single unitary component by an additive layer manufacturing process.

2. The gimbal of claim 1, wherein one or more of the core portion, the pipe engaging portions, the at least one flexible portion, and the at least one joint shield portion is cylindrical in cross-section.

3. The gimbal of claim 1, wherein the joint cover portions are equally spaced around the core portion.

4. The gimbal of claim 1, wherein the core portion further comprises at least one core portion joint guard that provides protective cover for the at least one flexible portion.

5. The gimbal of claim 4, wherein the at least one core portion joint guard is configured to complement the configuration of a respective one of the joint cover portions to maximise protective cover for the at least one flexible portion.

6. The gimbal of claim 1, wherein the at least one joint shield portion and the plurality of joint cover portions are configured to complement each other in order to maximise protective shielding for the at least one flexible portion of the gimbal.

7. The gimbal of claim 1, wherein the gimbal has two to six of the joint cover portions and a single one of the joint shield portion.

8. The gimbal of claim 1, wherein the gimbal has four of the joint cover portions, a single one of the joint shield portion, and the core portion has two of the pipe engaging portions and a single one of the at least one flexible portion.

9. The gimbal of claim 8, wherein at least one of the pipe engaging portions is elongated.

10. The gimbal of claim 8, wherein at least one of the pipe engaging portions is curved.

11. The gimbal of claim 1, wherein the gimbal has four of the joint cover portions, a single one of the joint shield portion, and the core portion has three of the pipe engaging portions and a single one of the at least one flexible portion.

12. The gimbal of claim 11, wherein at least one of the pipe engaging portions is elongated.

13. The gimbal of claim 11, wherein at least one of the pipe engaging portions is curved.

14. The gimbal of claim 1, wherein the gimbal has six to twelve of the joint cover portions, three of the joint shield portion, and the core portion has three of the pipe engaging portions and three of the flexible portion.

15. The gimbal of claim 1, wherein the gimbal has at least one compartment containing vibration stress dampening material.

16. The gimbal of claim 1, wherein each of the joint cover portions has an aperture that receives a pin portion that extends inwardly from the joint shield portion so each of the joint cover portions is pivotable with respect to the joint shield portion.

17. The gimbal of claim 1, wherein the pin portion extends integrally from an internal surface of the at least one joint shield portion to interlock each of the joint cover portions with the at least one joint shield portion.

18. The gimbal of claim 1, wherein the gimbal is a one-piece gimbal.

19. The gimbal of claim 1, wherein the core portion and the at least one joint shield portion are formed from a material selected from at least one of titanium, a titanium alloy, steel, a steel alloy, aluminium, an aluminium alloy, a nickel-based superalloy, and combinations thereof.

20. The gimbal of claim 1, wherein each of the plurality of pin portions interlocks with the respective one of the plurality of joint cover portions by extending through an aperture that is formed in the respective one of the plurality of joint cover portions.

21. A gas turbine engine that includes at least one gimbal according to claim 1.

22. A method for manufacturing a gimbal, the method comprising forming a gimbal according to claim 1 by additive layer manufacturing.

* * * * *